United States Patent
Matsumoto et al.

(10) Patent No.: US 7,215,518 B2
(45) Date of Patent: May 8, 2007

(54) MOTOR POWER SUPPLY LINE BREAKING DETECTION METHOD, MOTOR CONTROL APPARATUS AND ELECTRIC POWER STEERING MECHANISM USING THE SAME AND COMPUTER PROGRAM THEREOF

(75) Inventors: Tsutomu Matsumoto, Aichi-Pref (JP); Atsuo Sakai, Aichi-Pref. (JP); Takayoshi Suzuki, Aichi-Pref. (JP)

(73) Assignee: JTEKT Corporation, Osaka (JP)

( * ) Notice: Subject to any disclaimer, the term of this patent is extended or adjusted under 35 U.S.C. 154(b) by 1198 days.

(21) Appl. No.: 10/230,225

(22) Filed: Aug. 29, 2002

(65) Prior Publication Data

US 2003/0058589 A1 Mar. 27, 2003

(30) Foreign Application Priority Data

Aug. 31, 2001 (JP) .............................. 2001-262985

(51) Int. Cl.
H02H 7/08 (2006.01)
(52) U.S. Cl. .............................. 361/23; 361/1; 361/31; 318/490
(58) Field of Classification Search ................... 361/1, 361/23, 31; 340/648; 318/490
See application file for complete search history.

(56) References Cited

U.S. PATENT DOCUMENTS

| | | | |
|---|---|---|---|
| 4,600,835 A * | 7/1986 | Ishida et al. ........... | 250/231.16 |
| 4,834,201 A * | 5/1989 | Miyazaki et al. ........... | 180/446 |
| 5,304,912 A * | 4/1994 | Kajiwara et al. ........... | 318/802 |
| 5,306,888 A * | 4/1994 | Kaneko et al. ........... | 219/69.12 |
| 5,572,142 A * | 11/1996 | Muraki ........................ | 324/546 |
| 5,623,190 A * | 4/1997 | Tajima et al. ............... | 318/800 |
| 5,650,708 A * | 7/1997 | Sawada et al. ............. | 318/801 |

FOREIGN PATENT DOCUMENTS

| | | |
|---|---|---|
| EP | 0 636 528 | 2/1995 |
| EP | 0 696 842 | 2/1996 |
| JP | 2000177477 A * | 6/2000 |
| JP | 2005067350 A * | 3/2005 |

OTHER PUBLICATIONS

Patent Abstracts of Japan, JP 06-298104, Oct. 25, 1994.
Patent Abstracts of Japan, JP 11-150976, Jun. 2, 1999.
Patent Abstracts of Japan, JP 08-163889, Jun. 21, 1996.

* cited by examiner

*Primary Examiner*—Rita Leykin
(74) *Attorney, Agent, or Firm*—Oblon, Spivak, McClelland, Maier & Neustadt, P.C.

(57) ABSTRACT

According to the breaking detection processing, it is determined that (A) iu of AC current (absolute value) supplied to a motor is less than 0.5 amperes or iv thereof is less 0.5 amperes or iw thereof is less than 0.5 amperes, (B) the angular velocity of the motor is 1 rad/s or more and (C) at least any one of the current instruction values id*, iq* is 5 amperes or more in a step and then, a period in which all these three conditions (A)–(C) are satisfied at the same time is determined in another step. Consequently, it is determined that any one of the power supply lines in the motor is broken and a breaking detection flag is set to ON so as to detect the breaking.

8 Claims, 4 Drawing Sheets

MOTOR POWER SUPPLY LINE BREAKING DETECTION METHOD, MOTOR CONTROL APPARATUS AND ELECTRIC POWER STEERING MECHANISM USING THE SAME AND COMPUTER PROGRAM THEREOF

BACKGROUND OF THE INVENTION

1. Field of the Invention

The present invention relates to a breaking detection method for the power supply line of a motor, which is connected to the motor driven by AC current produced by converting from two phase to three or higher phase, a motor control apparatus and electric power steering mechanism using the same and a computer program thereof.

2. Description of the Related Art

Japanese Patent Application No.HEI11-355585, which is proposed by this inventor also, has disclosed a motor control apparatus for controlling a motor driven by AC current produced by converting from two phase to three or higher phase, for example, to three phase.

In such a motor control apparatus, a current flowing through phase u and phase v of a brushless DC motor is detected by a current detector and after amplified with a predetermined gain, that currents are converted to current detection values iu, iv by an A/D converting circuit and the respective current detection values iu, iv are fetched into a d/q converting portion so as to execute d/q conversion (two-phase conversion). Then, by feeding the current values id, iq obtained thereby back to current instruction values, d-axis current instruction value and q-axis current instruction value, deviations ΔId, ΔIq are obtained and supplied to proportional integration control. With these deviations ΔId, ΔIq, absence/presence of a current flowing through each phase (phase u, phase v, phase w) of the brushless DC motor or absence/presence of a breaking in the power supply line is monitored, In the meantime, the d/q conversion refers to a method in which while orthogonal coordinates are set with the same direction as magnetic flux of a motor rotator as axis d and a direction perpendicular to this axis d as axis q, AC is calculated as DC by copying the vector of AC current flowing through each phase to that orthogonal coordinates.

However, the conventional motor control apparatus described above monitors which of power supply lines (phase u, phase v, phase w) of AC current is broken or whether or not the current value of each of the current detection values iu, iv, iw becomes zero with the current deviations ΔId, ΔIq on the axis d-q, as shown in FIG. 4(A). For example, because the current detection value iu becomes zero if the power supply line of phase u is broken as shown in FIG. 4(B), the breaking in the power supply line of phase u is detected by the current deviations ΔId, ΔIq obtained by this d/q conversion.

Because usually, this current detection value iu deviates to both polarities of positive and negative as sine wave, the current value becomes almost zero when a rotation angle θ, which crosses zero, is located in the interval of α even if the power supply line is not broken (see FIG. 4). Thus, even if the breaking of the power supply line can be detected when the rotation angle θ of the motor is in the interval of β, the breaking cannot be detected when the rotation angle θ is in the interval of α. That is, there has been produced such a problem that depending upon a detection timing, absence/presence of a breaking of the power supply line cannot be monitored with the current deviations ΔId, ΔIq on the axis d-q alone.

SUMMARY OF THE INVENTION

The present invention has been achieved to solve the above-described problem and therefore, an object of the present invention is to provide a method for detecting any breaking of the power supply line of a motor, capable of detecting the breaking of the power supply line of the motor, a motor control apparatus, an electric power steering apparatus and a computer program thereof.

In order to achieve the above object, a breaking detection method for the power supply line of a motor according to the present invention, for detecting a breaking of the power supply line for AC current, connected to the motor driven with the AC current produced by converting from two phase to three or higher phase, is characterized in that the breaking of the power supply lines of said motor is detected by detecting a predetermined period in which all following conditions (A)–(C) are satisfied at the same time;
  (A) the current value of at least one of the AC currents supplied to the motor is substantially zero ampere,
  (B) the angular velocity of said motor is over a predetermined value,
  (C) the current instruction value to said motor is over a predetermined value.

A breaking of the power supply lines of the motor according to the present invention, is detected by detecting a predetermined period in which all following conditions (A)–(C) are satisfied at the same time;
  (A) the current value of at least one phase of the AC currents supplied to the motor is substantially zero ampere,
  (B) the angular velocity of the motor is over a predetermined value,
  (C) the current instruction value to the motor is over a predetermined value.

Thus, because (A) the current value of at least one phase of the AC currents supplied to the motor is substantially zero ampere, in addition, (B) the angular velocity of the motor is over a predetermined value, and (C) the current instruction value to the motor is over a predetermined value are the detecting conditions, erroneous detection upon detecting a power supply line of a single phase can be prevented by the condition (A), erroneous detection when the motor is stopped, by the condition (B) and erroneous detection when the current instruction value to the motor is smaller (for example, substantially zero), by the condition (C). Therefore, a breaking of the power supply line of the motor can be detected securely even when the current detection value of each phase crosses zero.

The technical feature of the breaking detection method of the power supply line of the motor in accordance with the more preferred teaching of the present invention, is characterized in that the motor is a brushless DC motor.

A breaking of the power supply line of the brushless DC motor in accordance with the more preferred teaching of the present invention, is detected by detecting a period in which all the conditions (A)–(C) are satisfied. Thus, because (A) the current value of at least one phase of the AC currents supplied to the brushless DC motor is substantially zero ampere, (B) the angular velocity of the brushless DC motor is over a predetermined value, and (C) the current instruction value to the brushless DC motor is over a predetermined value are the detecting conditions, erroneous detection upon detecting a power supply line of a single phase can be prevented by the condition (A), erroneous detection when the brushless DC motor is stopped, by the condition (B) and erroneous detection when the current instruction value to the brushless DC motor is smaller (for example, substantially zero), by the condition (C). Therefore, a breaking of the power supply line of the brushless DC motor can be detected securely even when the current detection value of each phase crosses zero.

Further, a motor control apparatus in accordance with the more preferred teaching of the present invention, driven with AC current produced by converting from 2 phase to 3 or higher phase, is characterized in that the breaking of the power supply line of the motor to be controlled is detected according to the breaking detection method for the power supply line of the motor.

A breaking of the power supply line of the motor to be controlled in accordance with the more preferred teaching of the present invention, is detected based on the breaking detection method for the power supply line of the motor. Thus, because the condition (A) the current value of at least one phase of the AC currents supplied to the motor is substantially zero ampere, in addition, the condition (B) the angular velocity of the motor is over a predetermined value, and the condition (C) the current instruction value to the motor is over a predetermined value are the detecting conditions, erroneous detection upon detecting a power supply line of a single phase can be prevented by the condition (A), erroneous detection when the motor is stopped, by the condition (B) and erroneous detection when the current instruction value to the motor is smaller (for example, substantially zero), by the condition (C). Therefore, a breaking of the power supply line of the motor can be detected securely even when the current detection value of each phase crosses zero.

An electric power steering mechanism for assisting steering by detecting a steering condition and driving a motor depending on the steering condition, in accordance with the more preferred teaching of the present invention, is characterized in that the breaking of the power supply line of the motor to be controlled is detected according to the breaking detection method for the power supply line of the motor.

In accordance with the more preferred teaching of the present invention, a breaking of the power supply line of the motor to assist steering is detected based on the breaking detection method for the power supply line of the motor. Thus, because the condition (A) the current value of at least one phase of the AC currents supplied to the motor is substantially zero ampere, in addition, the condition (B) the angular velocity of the motor is over a predetermined value, and the condition (C) the current instruction value to the motor is over a predetermined value are the detecting conditions, erroneous detection upon detecting a power supply line of a single phase can be prevented by the condition (A), erroneous detection when the motor is stopped, by the condition (B) and erroneous detection when the current instruction value to the motor is smaller (for example, substantially zero), by the condition (C). Therefore, a breaking of the power supply line of the motor can be detected securely even when the current detection value of each phase crosses zero.

A computer program in accordance with the more preferred teaching of the present invention, is characterized by including a program for making the breaking detection method for the power supply line of the motor to function by the computer.

In accordance with the more preferred teaching of the present invention, a program for making the breaking detection method for the power supply line of the motor to function by computer is included. Thus, the breaking detection method for the power supply line of the motor can be made to function by computer according to that program. Therefore, a breaking of the power supply line of the motor can be detected securely by that function of the computer even when the current detection value of each phase crosses zero.

DESCRIPTION OF THE PREFERREED EMBODIMENTS

Hereinafter, the embodiment of the present invention will be described with reference to the accompanying drawings.

The structure of the control apparatus of a motor (hereinafter referred to as motor control apparatus), to which the breaking detection method for the power supply line of a motor of the present invention will be described with reference to FIG. 2.

Figure 2:
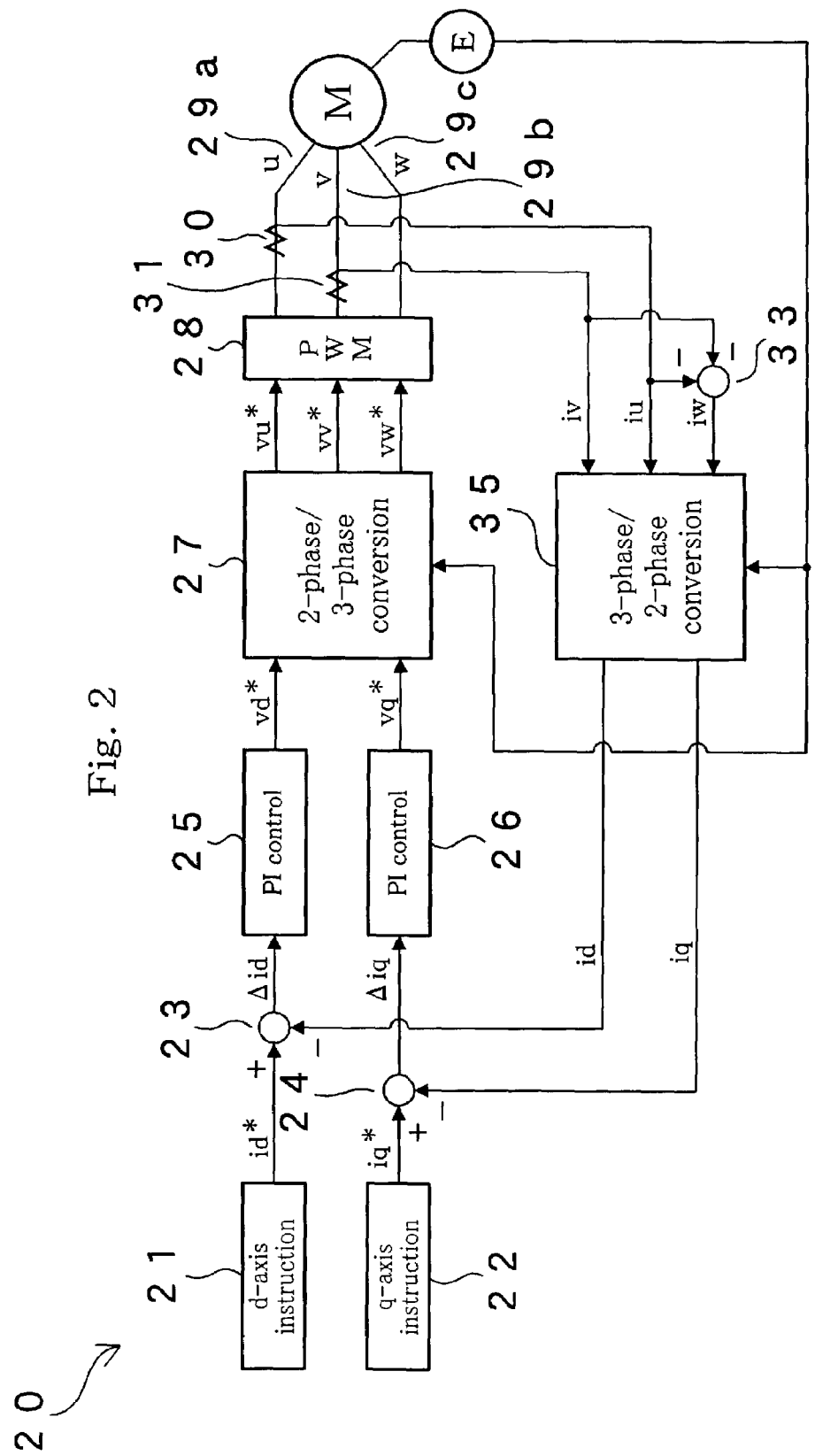
FIG. 2 is a block diagram showing main functional configuration of the motor control apparatus according to the embodiment of the present invention.

FIG. 2 shows main functional blocks, which compose the motor control apparatus 20.

The motor control apparatus 20 comprises mainly a d-axis instruction 21, a q-axis instruction 22, computing portions 23, 24, PI control portions 25, 26, a 2-phase/3-phase converting portion 27, a pulse width modulating portion 28, current detectors 30, 31, a computing portion 33, a 3-phase/2-phase converting portion 35 and an encoder E. Individual functional portions except the pulse width modulating portion 28 and the encoder E are processed by computation with software through a computer.

In this motor control apparatus, currents flowing through phase u and phase v of the motor M are detected by the current detectors 30, 32, converted to digital current detection values iu, iv and inputted to the 3-phase/2-phase converting portion 35. The current iw of phase w can be obtained by subtracting from the current detection values iu, iv and a result obtained by this computation is inputted to the 3-phase/2-phase converting portion 35 as a current value iw of phase w.

The 3-phase/2-phase converting portion 35 converts the inputted current values iu, iv, iw to current values id, iq through d/q conversion (2-phase conversion) based on a detection signal detected by the encoder E for detecting the rotation angle of the rotator of the motor M and outputs. The current values id, iq are respectively inputted to the computing portions 23, 24 as each feed back value.

The q-axis instruction 22 or the like is inputted to the computing portions 23, 24 as a torque instruction for the motor M. That is, a torque to be generated in the rotator of the motor M is computed based on the q-axis instruction 22 and then inputted to the computing portion 24 as a q-axis current instruction value iq* while exciting current of the rotator of the motor M is computed based on the d-axis instruction 21 and inputted to the computing portion 23 as a d-axis current instruction value id*. In the meantime, because no exciting current needs to be supplied in case of a brushless DC motor whose rotator is a magnet, usually, the d-axis current instruction value id* is set to zero ampere (id* ≈ 0).

The d-axis current instruction value id* and a current value id obtained by converting with the 3-phase/2-phase converting portion are inputted to the computing portion 23. Therefore, a deviation between both computed results is outputted in the form of Δid from the computing portion 23 and then inputted to the PI control portion 25. Likewise, because the q-axis current instruction value iq* and a current value iq obtained by converting with the 3-phase/2-phase converting portion 35 are inputted to the computing portion 24 and a deviation between both computed results is outputted in the form of Δiq from the computing portion 23 and inputted to the PI control portion 26.

The PI control portions 25, 26 carry out proportional integration upon the inputted deviations Δid, Δiq and then compute the d-axis voltage instruction value vd* and q-axis voltage instruction value vq* using a predetermined voltage equation so as to output to the 2-phase/3-phase converting portion 27.

The 2-phase/3-phase converting portion 27 d/q inversion-converts (3-phase conversion) respective inputted d-axis voltage instruction value vd* and q-axis voltage instruction value vq* so as to compute voltage instruction values vu*, vv*, vw*. The pulse width modulating portion (PWM) 28 fetches in the voltage instruction values vu*, vv*, vw* and outputs pulse signals having each corresponding pulse width to a driving circuit (not shown). The driving circuit applies a driving voltage to the motor M through the power supply lines 29a, 29b, 29c of phase, u, phase v, and phase w.

If the motor control apparatus 20 is constructed as described above, it can be controlled so that the deviation in each of the current instruction value and feedback value is zero. As a result, the motor M can be controlled in terms of its torque and the like.

The breaking detection processing, in which the breaking detection method for the motor power supply line of the present invention is applied to the motor control apparatus 20 having the above-described structure, will be described with reference to FIG. 1.

Figure 1:
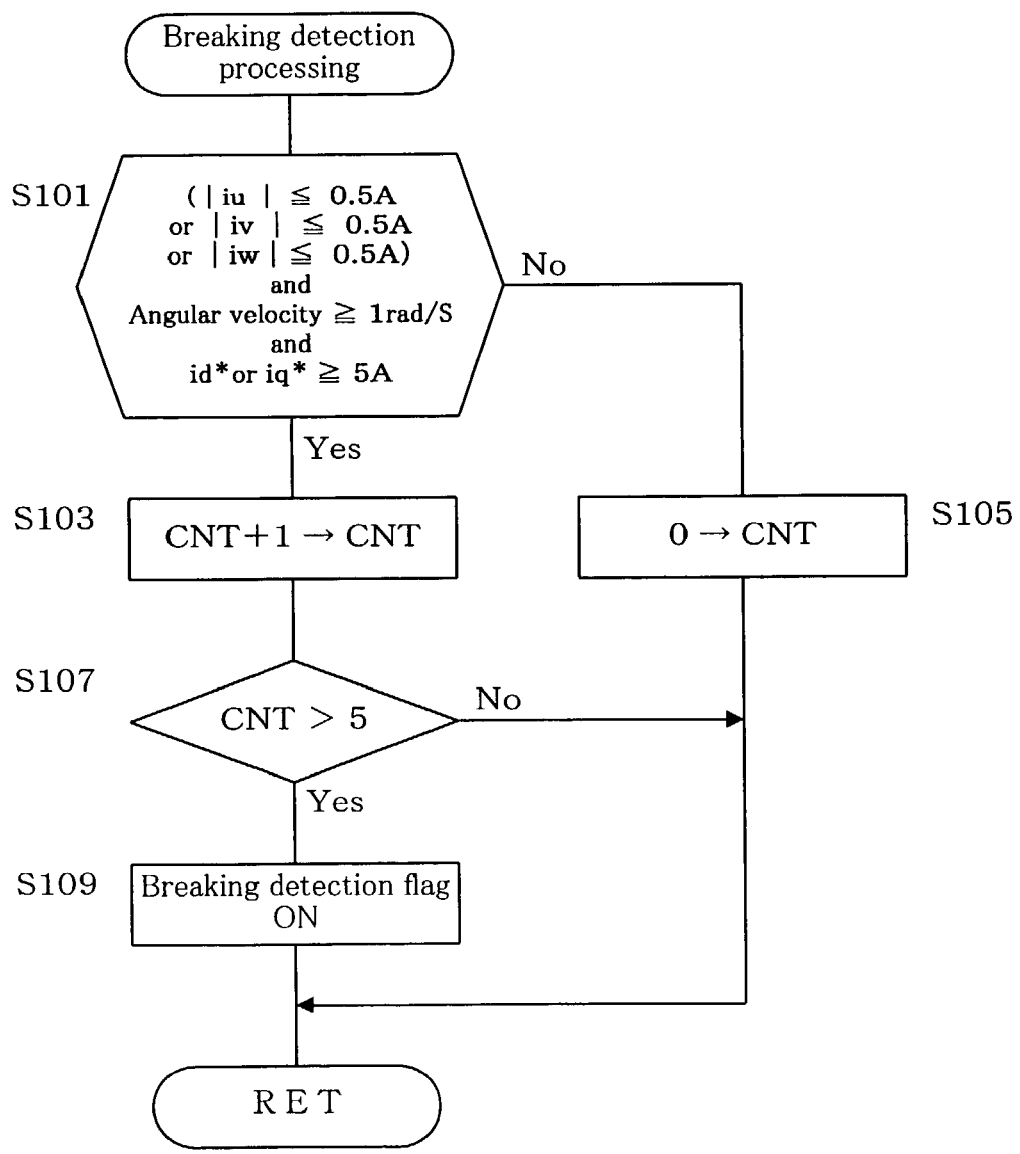
FIG. 1 is a flow chart showing a flow of breaking detection processing based on the method for detecting a breaking of power supply line of a motor according to an embodiment of the present invention.

Because the breaking detection processing shown in FIG. 1 is formed in a subroutine, it is incorporated in a sequence of timer interruption processing generated every predetermined time. Thus, a predetermined initialization processing necessary before this breaking detection processing is executed, for example, initialization processing for counter CNT, breaking detection flag and the like, which will be described later, is carried out depending on a main routine calling this breaking detection processing.

First, in the breaking detection processing, three conditions are considered in step S101. More specifically, the first condition of this embodiment is, for example, that the AC current iu (absolute value) supplied to the motor M is substantially 0 ampere or less than 0.5 A or the iv is substantially 0 or less than 0.5 A or the iw is substantially 0 or less than 0.5 A, the second condition is that the angular velocity of the motor M is 1 rad/s or more and the third condition is that the current instruction value to the motor M is 5 amperes or more.

As for the first condition that "the AC current iu (absolute value) supplied to the motor M is less than 0.5 amperes, the iv is less than 0.5 amperes and the iw is less than 0.5 amperes", a current value iu flowing through the power supply line 29a of phase u shown in FIG. 2, a current iv flowing through the power supply line 29b of phase v and a current iw flowing through the power supply line 29c of phase w are determined based on the outputs of the current detectors 30, 31 and the computation result of the computing portion 33. That is, this is executed by determining whether the current detection values iu, iv, iw inputted to the 3-phase/2-phase converting portion 35 are a predetermined value or less than the predetermined value.

According to the first condition, whether or not there is any breaking in the power supply lines 29a, 29b, 29c can be determined and by determining which phase a current value satisfying that condition corresponds to, a power supply line having a fear of a breaking can be pinpointed.

The second condition that "the angular velocity of the motor M is 1 rad/s or more" is determined by subjecting the output of the encoder E for detecting the rotation angle of the motor M to time differentiation so as to obtain an angular velocity. That is, this is executed by determining whether or not the detection signal of the encoder E to be inputted to the 2-phase/3-phase converting portion 27 or the 3-phase/2-phase converting portion 35 is 1 rad/s or more.

Figure 4:
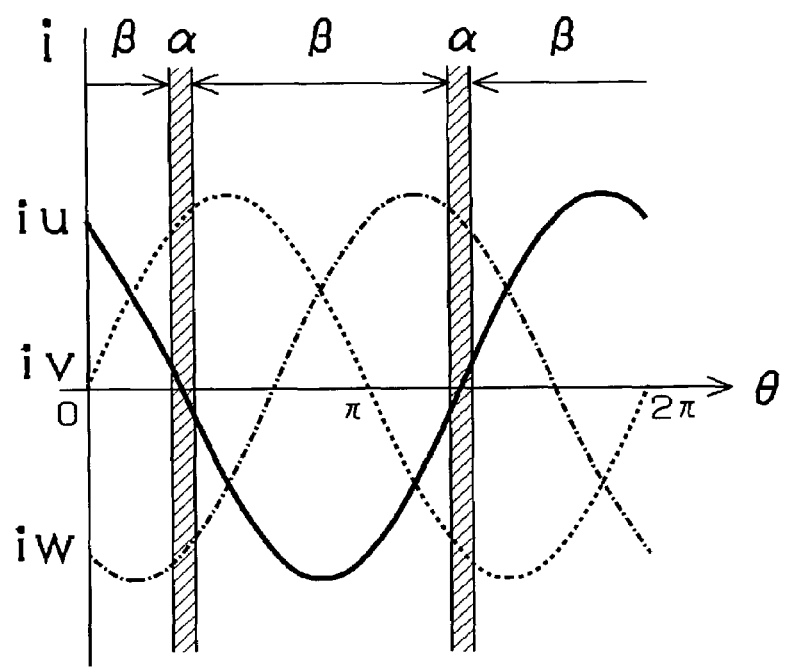
FIG. 4 is an explanatory diagram showing a detection wave of AC current supplied to a 3-phase motor, while FIG. 4(A) indicates a normal case and FIG. 4(B) indicates a case where the power supply line of phase u is broken.
Figure 4:
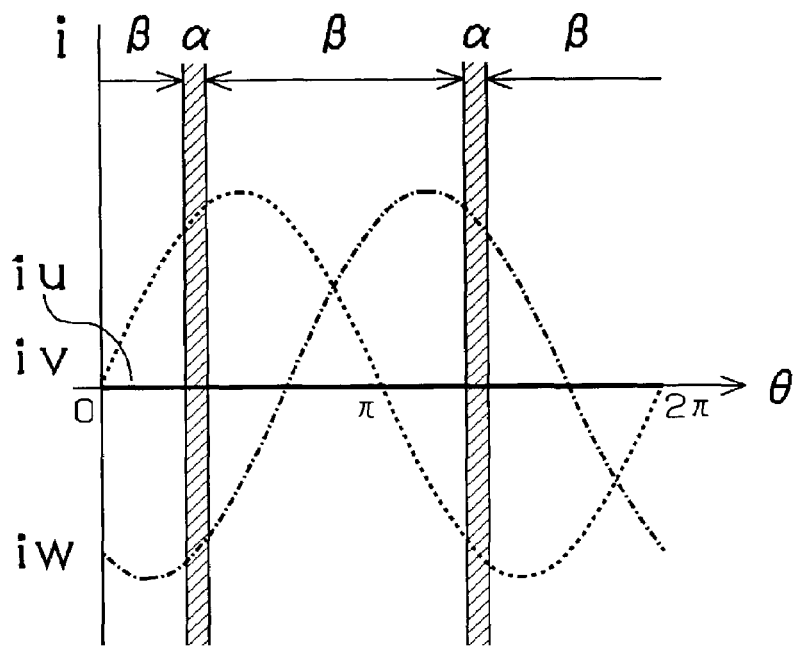

Due to the second condition, even if the power supply lines 29a, 29b, 29c are not broken when the angular velocity of the motor M is not 1 rad/s or more or the rotation of the motor M is stopped or in ultra slow rotating condition near the stop condition, the current values iu, iv, iw becomes values approximate to zero as described in FIG. 4. Thus, by adding the second condition, it is possible to prevent an erroneous detection of a case where the current values iu, iv, iw become values approximate to zero even if the motor is in a normal condition.

The third condition that "the current instruction value to the motor M is 5 amperes or more" is determined based on the d-axis current instruction value id* by the d-axis instruction 21 and the q-axis current instruction value iq* by the q-axis instruction 22. That is, this is executed by determining whether or not at least any one of the d-axis current instruction value id* or the q-axis instruction value iq* of the motor M is set to 5 amperes or more.

Due to the third condition, even if any one of the power supply lines 29a, 29b, 29c is not broken when the current instruction value to the motor M is not 5 amperes or more or generation of torque is not instructed to the motor or generation of a low torque is instructed, the current values iu, iv, iw become values approximate to zero as described in FIG. 4. Thus, by adding this third condition, it is possible to prevent an erroneous detection of a case where the current values iu, iv, iw become values approximate to zero even if the motor is in a normal condition.

If it is determined that all these three conditions are satisfied in step S101 (Yes in step S101), the processing proceeds to step S103, in which 1 is added to the counter CNT1. Namely, the counter CNT, which counts frequencies in which the three conditions are satisfied at the same time, is incremented.

On the other hand, if it is determined that these three conditions cannot be satisfied at the same time in step S101 (No in step S101), the processing proceeds to step S105, in which the counter CNT is zero-cleared and then this breaking detection processing is terminated. That is, if the condition of step S101 is not satisfied even once although all the conditions of step S101 are satisfied at the same time, processing of erasing the value on the counter CNT is carried out. Consequently, a further erroneous detection can be prevented.

In step S107, whether or not the value of the counter CNT exceeds 5 is determined. That is, the breaking of the power supply lines 29a, 29b, 29c of the motor M is detected by detecting a predetermined period in which the three conditions are satisfied at the same time in step S101. More specifically, if the frequency in which the condition of step S101 is satisfied exceeds 5 by a result of adding to the counter CNT (Yes in step S107), it is determined that any one of the power supply lines 29a, 29b, 29c is broken and in subsequent step S109, breaking detection flag is turned ON (for example, value 1). Then, this breaking detection processing is terminated.

As described previously, this breaking detection processing of this embodiment is timer interruption processing which is activated every predetermined time. Thus, a predetermined "period in which all the three conditions are satisfied" can be detected by step S107 for determining that the condition of step S101 is satisfied five or more times continuously and step S105 for erasing the value of the counter CNT even if the condition of step S101 is not satisfied even once.

On the other hand, because it is not yet determined which of the power supply lines 29a, 29b, 29c is broken if the frequency in which the condition of step S101 is satisfied does not exceed five times (No in step S107), this breaking detection processing is terminated.

As described above, according to the breaking detection processing of FIG. 1, in step S101, it is determined (A) that the iu, iv and iw of the AC current (absolute value) supplied to the motor M are less than 0.5 amperes each, (B) that the angular velocity of the motor M is 1 rad/s or more and (C) that at least any one of the current instruction values id*, iq* is 5 amperes or more. A predetermined period in which all these three conditions (A)–(C) are satisfied is determined in step S107 so as to determine which of the power supply lines 29a, 29b, 29c is broken and then, the breaking detection flag is set to ON so as to detect any breaking of the line.

Because the breaking detection flag as a detection condition that all the three conditions (A)–(C) are satisfied at the same time in a predetermined period is set to ON, an erroneous detection in each of the condition (A) for detecting a breaking of the power supply line of a phase, the condition (B) that the rotation of the motor M is stopped and the condition (C) that the current instruction values id*, iq* to the motor M are less than a predetermined value can be prevented. Thus, according to the main routine for calling this breaking detection processing, a breaking of the power supply lines 29a, 29b, 29c of the motor M can be detected securely by determining the condition of the breaking detection flag even in a period in which the current detection value of each phase crosses zero.

Although the above-described breaking detection processing detects a predetermined period in which "all the three conditions are satisfied at the same time" in step S105 and step S107, the present invention is not restricted to this and it is permissible to apply such an algorithm of counting only the frequency that the condition of step S101 is satisfied and setting the breaking detection flag to ON if that value exceeds a predetermined frequency. Consequently, the breaking detection which paid attention to only the frequency that the condition of step S101 is satisfied can be carried out.

Subsequently, an example in which the motor control apparatus having the structure shown in FIG. 2 is applied to an electric power steering mechanism while the breaking detection method for the motor power supply line of the present invention will be described with reference to FIG. 3.

In the meantime, an example of an electric power steering mechanism 50 provided on a vehicle such as automobile as an electric power steering mechanism of the present invention will be described.

Figure 3:
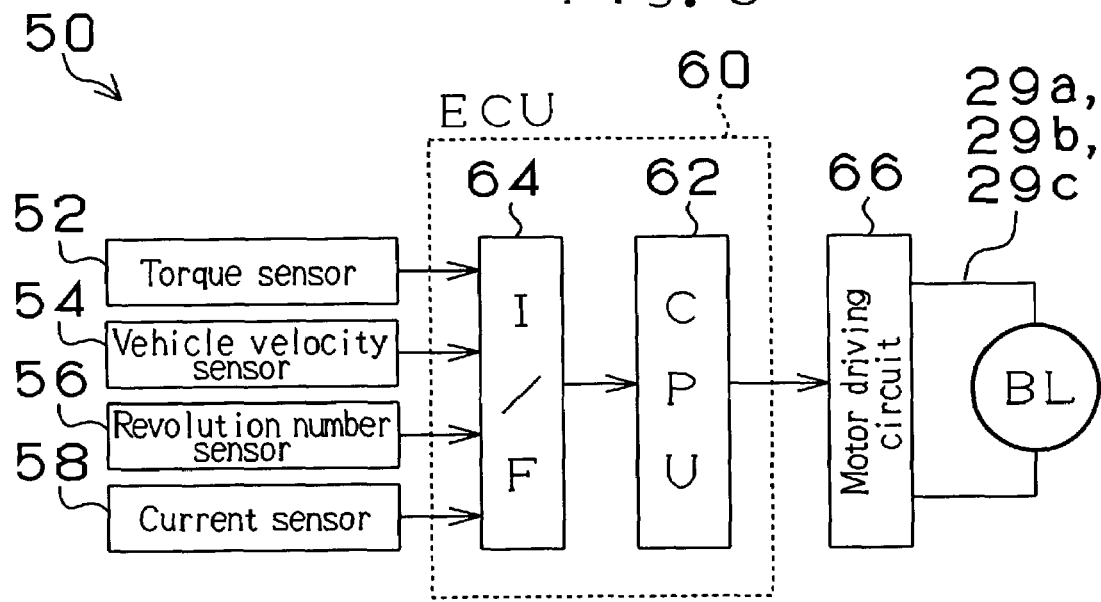
FIG. 3 is a block diagram showing main hardware configuration of the electric power steering apparatus according to the embodiment of the present invention.

As shown in FIG. 3, the electric power steering mechanism 50 comprises mainly various kinds of sensors such as a torque sensor 52, a vehicle velocity sensor 54, a revolution number sensor 56, a current sensor 58, an ECU 60, a motor driving circuit 66 and a brushless DC motor BL.

The d-axis instruction 21, the q-axis instruction 22, the computing portions 23, 24, the PI control portions 25, 26, the 2-phase/3-phase converting portion 27, the computing portion 33 and the 3-phase/2-phase converting portion 35 are achieved by software which is computed by the CPU 62 in the ECU 60. On the other hand, the pulse width modulating portion 28 is achieved by hardware which constructs the ECU 60 or the motor driving circuit 66 and the current detectors 30, 31, the motor M and the encoder E correspond to the current sensor 58, the brushless DC motor BL and the revolution number sensor 56 shown in FIG. 3.

The torque sensor 52 detects a steering torque from a torsion amount of a torsion bar or the like which connects the input shaft coupled to the vehicle steering wheel with the output shaft coupled to the steering mechanism such that they can be rotated relatively. This detected steering torque is inputted to the ECU 60 together with the vehicle velocity detected by the vehicle velocity sensor 54. The revolution number of the brushless DC motor BL assisting the steering force of a steering wheel is detected by the revolution number sensor 56 and further, the current values iu, iv flowing through the phase u and phase v of the brushless DC motor BL are detected by the current sensor 58 and inputted to the ECU 60.

The CPU 62 which constructs the ECU 60, determines the current instruction values id*, iq* to be transmitted to the motor driving circuit 66 based on a steering torque, a vehicle velocity and a motor revolution number inputted through an interface 64. That is, these information pieces are inputted to the d-axis instruction 21 and the q-axis instruction 22 shown in FIG. 2 and converted to the d-axis current instruction value id* and q-axis current instruction value iq* so as to determine the current instruction values id*, iq*. As described above, in the CPU 62, the PI control portions 25, 26 proportional-integrate the deviations Δid, Δiq relative to the feedback values id, iq inputted to the computing portions 23, 24 so as to output the d-axis voltage instruction values vd* and the q-axis voltage instruction value vq* and then these values are d/q inversion converted by the 2-phase/3-phase converting portion 27 so as to compute the voltage instruction values vu*, vv*, vw*. Then, these voltage instruction values vu*, vv*, vw* are outputted to the pulse width modulating portion 28 of the motor driving circuit 66.

In the motor driving circuit 66, the voltage instruction values vu*, vv*, vw* transmitted from the CPU 62 are outputted to the brushless DC motor BL through the power supply lines 29a, 29b, 29c and currents of phase u and phase v flowing through the power supply lines 29a, 29b, 29c are detected by the current sensor 58 and the current detection values iu, iv are inputted to the ECU 60. Therefore, the brushless DC motor BL can generate an assist torque for assisting the steering force or generate a torque for restoring the steering wheel.

In the electric power steering mechanism 50, the CPU 62 of the ECU 60 executes the breaking detection processing shown in FIG. 1 in the sequential timer interruption processing which is generated every predetermined time so as to detect a breaking of the power supply lines 29a, 29b, 29c of the brushless DC motor BL assisting the steering action. Then, it is determined (A) that the iu, iv, and iw of the DC current (absolute value) supplied to the brushless DC motor BL are less than 0.5 amperes respectively, (B) that the angular velocity of the brushless DC motor BL or the steering velocity of the steering wheel is 1 rad/s or more and (C) that at least any one of the current instruction values id*, iq* relative to the brushless DC motor is 5 amperes or more, and a predetermined period in which all these three conditions (A)–(C) are satisfied at the same time is determined in step S107 so as to determine that any one of the power supply lines 29a, 29b, 29c of the brushless DC motor BL is broken. Then, the breaking detection flag is set to ON so as to detect any breaking of the line.

Because the breaking detection flag as a detection condition that all the three conditions (A)–(C) are satisfied at the same time in a predetermined period is set to ON, an erroneous detection in each of the condition (A) for detecting a breaking of the power supply line of a phase, the condition (B) that the rotation of the brushless DC motor BL is stopped and the condition (C) that the current instruction values id*, iq* to the brushless DC motor BL are less than a predetermined value can be prevented. Thus, according to the main routine by the CPU 62 for calling this breaking detection processing, a breaking of the power supply lines 29a, 29b, 29c in the brushless DC motor BL can be detected securely by determining the condition of the breaking detection flag even in a period in which the current detection value of each phase crosses zero.

As described above, whether or not any one of the power supply lines 29a, 29b, 29c in the motor control apparatus 20 having the structure shown in FIG. 2 is broken can be determined by executing the breaking detection processing by means of the CPU 62 in the ECU 60. For the reason, the computer program including such a breaking detection processing (breaking detection method for the power supply line of the motor) can detect any breaking of the power supply lines for AC current supplied to the motor in such an operating environment comprising "current detecting means for detecting an AC current supplied to the motor", "angular velocity detecting means for detecting the angular velocity of the motor" and "current instruction value detecting means for detecting the current instruction value for the motor".

Although the invention has been disclosed in the context of a certain preferred embodiments, it will be understood that the present invention extends beyond the specifically disclosed embodiments to other alternative embodiments of the invention. Thus, it is intended that the scope of the invention should not be limited by the disclosed embodiments but should be determined by reference to the claims that follow.

What is claimed is:

1. A breaking detection method for the power supply line of a motor, for detecting a breaking of the power supply line for AC current, connected to the motor driven with the AC current produced by converting from two phase to three or higher phase, wherein the breaking of the power supply lines of said motor is detected by detecting a predetermined period in which all following conditions (A)–(C) are satisfied at the same time;
    (A) the current value of at least one phase of the AC currents supplied to the motor is substantially zero ampere,
    (B) the angular velocity of said motor is over a predetermined value,
    (C) the current instruction value to said motor is over a predetermined value.

2. A breaking detection method for the power supply line of the motor as claimed in claim 1 wherein said motor is a brushless DC motor.

3. A motor control apparatus driven with AC current produced by converting from 2 phase to 3 or higher phase, wherein
    the breaking of the power supply lines of said motor is detected by detecting a predetermined period in which said all conditions (A)–(C) are satisfied at the same time;
    thereby the breaking of the power supply line of the motor to be controlled is detected according to the breaking detection method for the power supply line of the motor as claimed in claim 1.

4. A motor control apparatus driven with AC current produced by converting from 2 phase to 3 or higher phase, wherein
    the breaking of the power supply lines of said motor is detected by detecting a predetermined period in which said all conditions (A)–(C) are satisfied at the same time;
    thereby the breaking of the power supply line of the motor to be controlled is detected according to the breaking detection method for the power supply line of the motor as claimed in claim 2.

5. An electric power steering mechanism for assisting steering by detecting a steering condition and driving a motor depending on the steering condition, wherein
    the breaking of the power supply lines of said motor is detected by detecting a predetermined period in which said all conditions (A)–(C) are satisfied at the same time;
    thereby the breaking of the power supply line of the motor to be controlled is detected according to the breaking detection method for the power supply line of the motor as claimed in claim 1.

6. An electric power steering mechanism for assisting steering by detecting a steering condition and driving a motor depending on the steering condition, wherein
    the breaking of the power supply lines of said motor is detected by detecting a predetermined period in which said all conditions (A)–(C) are satisfied at the same time;
    thereby the breaking of the power supply line of the motor to be controlled is detected according to the breaking detection method for the power supply line of the motor as claimed in claim 2.

7. A computer program including a program for making the breaking detection method for the power supply line of a motor, for detecting a breaking of the power supply line for AC current, connected to the motor driven with the AC current produced by converting from two phase to three or higher phase, as claimed in claim 1 function by the computer.

8. A computer program including a program for making the breaking detection method for the power supply line of a motor, for detecting a breaking of the power supply line for AC current, connected to the motor driven with the AC current produced by converting from two phase to three or higher phase, as claimed in claim 2 function by the computer.

* * * * *